Nov. 27, 1956  F. S. SLICK  2,772,372
COMPOSITE DISTRIBUTOR ROTOR

Filed Feb. 2, 1955  2 Sheets-Sheet 1

INVENTOR.
FRED S. SLICK
BY
AGT.

Nov. 27, 1956  F. S. SLICK  2,772,372
COMPOSITE DISTRIBUTOR ROTOR

Filed Feb. 2, 1955  2 Sheets—Sheet 2

INVENTOR.
FRED S. SLICK
BY
AGT.

United States Patent Office 2,772,372
Patented Nov. 27, 1956

2,772,372

COMPOSITE DISTRIBUTOR ROTOR

Fred S. Slick, Rockford, Ill., assignor to J. I. Case Company, Racine, Wis., a corporation of Wisconsin Application February 2, 1955, Serial No. 485,731

11 Claims. (Cl. 310—70)

This invention relates to a distributor rotor having a drive gear integrally molded therewith. This invention also comprises molding of the contact elements integrally with the rotor so as to simplify the construction and to eliminate metal components that usually tend to encourage arcing of the current at undesirable points.

One obejct of this invention is to provide a distributor rotor that is an integral part of the driven gear.

Another object of this invention is to provide a distributor rotor that has a minimum number of metal components.

Another object of this invention is to provide a distributor rotor and driven gear as an integral unit and made of a plastic material that is suitable for the purpose and requires no lubrication with respect to the meshing gears, or to the journal.

Another object is to provide a distributor rotor of a suitable plastic material having the desired gear and bearing properties and which is combined with another plastic having different physical properties and molded into the face of the distributor rotor for the purpose of providing a superior track for the carbon brushes.

Still another object is to provide a distributor rotor having improved means of shielding against the undesirable jumping of the spark.

Another object is to provide a distributor rotor having its metal components securely molded in place.

Another object is to provide a distributor rotor having an improved means for journalling it in the magneto frame.

Further objects and advantages of this invention will become apparent from a consideration of the following detailed description taken in connection with the accompanying drawings, wherein a satisfactory embodiment of the invention is shown. However, it is to be understood that the invention is not limited to the details disclosed but includes all such variations and modifications as fall within the spirit of the invention.

Distributor rotors in the past were generally of the built-up type in which the brush contacts were secured to the rotor with screws or rivets. Frequently, in this type of rotor, the drive gear was a separate component from the rotor and had to be fastened thereto in some suitable manner, which usually increased the cost of the completed assembly. These metal screws or rivets sometimes caused considerable trouble in that the spark would jump to them, thus impairing the operation of the magneto. When screws were used, they would frequently work loose and cause trouble by dropping into the moving parts of the magneto, or by permitting a component to become displaced.

Distributor rotors in the past also were considerably higher in cost in that the journal comprised a pin which was either molded or pressed into place in the rotor. This journal pin required a bushing in which to run, and which bushing was of bronze or powder metal pressed to shape and provided with lubrication. Also, a means was required to secure the pin against axial displacement.

The present invention eliminates the above mentioned objections in that the distributor rotor, driven gear, and journal portion are molded integrally, and the metal inserts in the face of the distributor rotor are also molded in place. One result of this construction is that this rotor is more compact, and therefore, requires less space so that the magneto can also be reduced in its outward dimensions.

Another advantage of this novel distributor rotor is that it has properties that make lubrication of the journal unnecessary.

Referring to the drawing.

Figure 1:
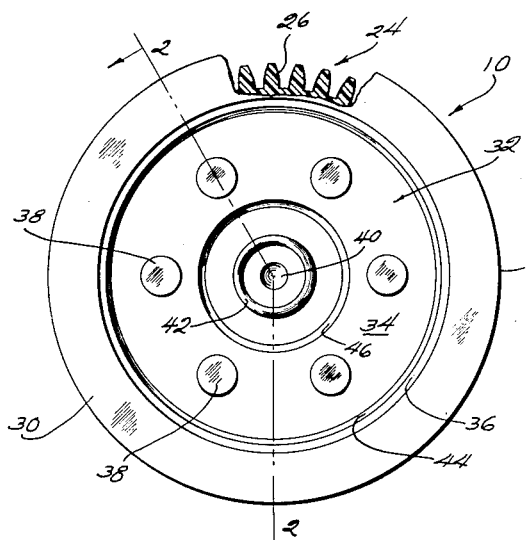
Fig. 1 shows a view of the face of the distributor rotor showing the details thereof before the metal inserts have been molded in place.
Figure 2:
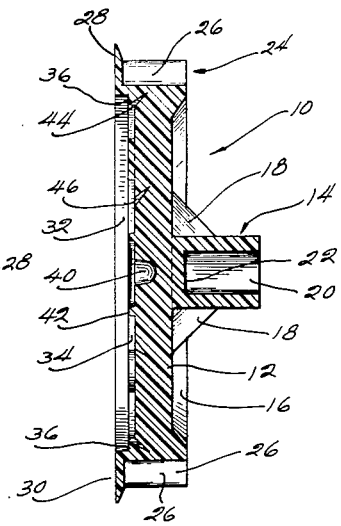
Fig. 2 is a section taken at 2—2 of Fig. 1.

Referring to Figs. 1 and 2, the rotor of this invention, being generally designated 10, is a unitary molding of polyamide resin plastic, known by the trademark "Zytel." This material has properties that make it suitable for use when molding components such as that under consideration.

Polyamide resin plastic is highly heat resistant, and tough over a wide range of temperatures, is abrasion resistant, retains its form at high temperatures, is a good bearing material which needs no lubrication, is easily molded and has the necessary electric properties for use as a distributing rotor. However, the applicant is aware of other resins that may have like properties such as the above polyamide resin, and the present application is not limited to this specific resin.

Rotor 10 is generally in the form of a disc 12 shown in Figs. 1 and 2 and is provided integrally with a hub 14 extending from the back face of the disc 12. A recess 16 is provided in the back face of the disc 12 concentric with hub 14 and serves to reduce the amount of overhang of the disc relative to the bearing pin, which pin will be described later. A plurality of strengthening webs 18 are provided at the juncture between recess 16 and hub 14 in order to provide sufficient rigidity.

A cylindrical journal aperture 20 is provided in hub 14 which has a thrust-bearing bottom portion 22. The bearing details will be described later in connection with Fig. 4.

A driven gear 24 is formed integrally with the periphery of disc 12 and comprises teeth 26. A flange 28 is molded on the front face 30 of disc 12 and extends outwardly beyond the periphery of teeth 26. Flange 28 serves as a means of strengthening the teeth 26 and also as a means to retain the mating pinion in mesh, the latter not being shown, as it does not concern this invention.

Front face 30 of disc 12 is provided with a depression or recess 32. Depression 32 has a plane surface 34 parallel to front face 30, shown in Figs. 1 and 2. A ledge 36 is provided about the periphery of depression 32 and lies in a plane a suitable distance below the surface of front face 30. A plurality of pads 38, in this instance there are 6, are provided for the purpose of anchoring the plastic alkyd to be later introduced into the depression 32, against rotation relative to rotor disk 12. A cavity 40 serves to prevent undesirable cavities in the molded component caused by shrinkage of the plastic adjoining dense sections, and has no other function. A raised concentric ring 42 is molded on the face of depression 32 for a purpose to be later described. A pair of undercut concentric grooves 44 and 46 shown in Figs. 1 and 2 serve to anchor the plastic alkyd in the final molding operation which will be more fully described.

Ledge 36, pads 38, and ring 42 lie in a common plane so that the metal inserts which are to be subsequently molded in will rest on these elements so that the upper surfaces of the inserts and the subsequently molded resin will lie in a plane common with front face 30.

Figure 3:
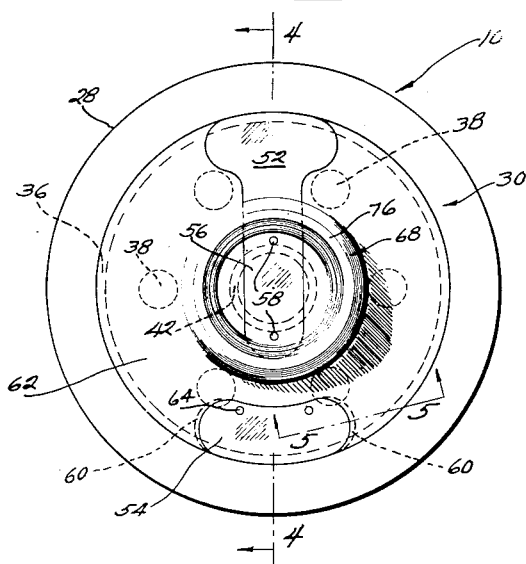
Fig. 3 shows a view of the face of the distributor rotor showing the metal inserts molded in place.
Figure 4:
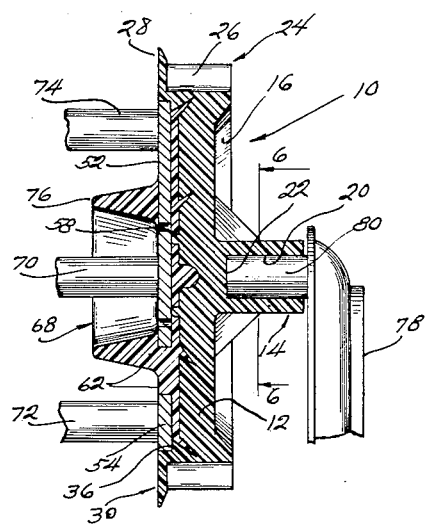
Fig. 4 is a section taken at 4—4 of Fig. 3, and shows the novel journal arrangement, and also includes the carbon brushes.

Referring to Figs. 3 and 4, a pair of inserts of Monel metal or similar material are provided. Insert 52 is the brush contact, and insert 54 is a counterweight to compensate for the mass of the brush contact 52.

Brush contact insert 52 is of a general T-shape as shown in Fig. 3, the outer end thereof coinciding with the periphery of depression 32. A tongue portion 56 extends radially inwardly to a point beyond the axis of disc 12 and rests upon ring 42. A pair of holes 58 are provided so that insert 52 can be accurately positioned in the mold during the subsequent molding operation.

Figure 5:
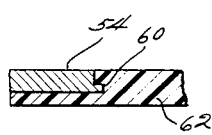
Fig. 5 is a section taken at 5—5 of Fig. 3 and which shows the method of anchoring the counterbalance in the alkyd.

Insert 54 serves merely as a counterweight to compensate for the mass in the brush contact insert 52, so as to avoid vibration at high speeds. Insert 54 has an outer periphery that conforms to the periphery of depression 32. The ends of insert 54, as indicated in Figs. 3 and 5, are provided with tongue portions 60 for the purpose of securely anchoring this insert in the alkyd resin 62. A pair of holes 64 are provided so that insert 54 can be accurately positioned in the mold during the molding of the alkyd resin.

The final step in completing the composite rotor of this invention is to locate the inserts 52 and 54 of the previously molded nylon gear in their proper relationship in a mold so that the alkyd resin can be added to the depression 32.

Alkyd resin designated 62 has been selected as the best material for the brush track because of its resistance to imbedding of carbon particles from the brushes and its superior wearing properties and resistance to scoring by the carbon brushes. The alkyd resin fills the spaces in the depression 32, the undercut grooves, around the pads 38, and all voids, and when the molding is completed the inserts 52 and 54, and the front face 30 of the alkyd molding 62 all lie substantially in a common plane.

A novel feature of this invention is the provision of a spark barrier 68 to hinder the flow of current from the center brush 70 to brushes 72 and 74 along the surface of the face 30. This feature is shown in Fig. 4 and comprises a ring shaped portion 76 concentric with the axis of the disc 12. Ring portion 76 is of a cross section as shown in Fig. 4 and extends from the front face 30 outwardly and converges as shown. Ring 76, because of its increase in the linear surface distance from brush 70 to brushes 72 and 74, effectively reduces the tendency to arcing between the brushes. Ring 76 also serves to anchor insert 52 in place in the alkyd so that the insert cannot become displaced relative to the face 30.

When the final step of molding the alkyd 62 is being done, the heat transmitted by the alkyd to the previously molded polyamide resin plastic causes the latter to expand. When the completed composite molding cools, the nylon resin grips the alkyd resin because the radial contraction of the former is greater than that of the alkyd, thus a composite unitary rotor results which is superior to that generally in use, and which latter are assembled of parts secured by screws, rivets, or other fastening methods.

A portion of a magneto frame 78 is shown in Fig. 4 in which is mounted a bearing pin 80, the latter being either cast or pressed in place. Aperture 22, also shown in Fig. 2, is made a close fit for pin 80 so that under operating conditions, the heat generated by the magneto will tend to expand the hub 14 in a radial direction, and consequently, enlarge aperture 22 slightly. Thus there is no danger of the journal becoming tight on the pin 80 during operation of the magneto. Any tendency of the rotor to wobble because of any looseness of the journal is eliminated by the balancing pressure of the brushes 72 and 74 on the surface of the alkyd. The thrust induced by the brushes is met by thrust surface 22 in contact with the end of pin 80.

Figure 7:
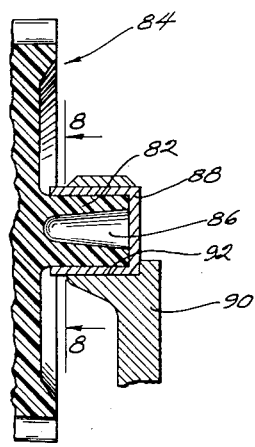
Fig. 7 is an axial section through a modified form of the journal.
Figure 8:
Fig. 8 is a section taken through the journal at 8—8 of Fig. 7 normal to the axis.
Figure 6:
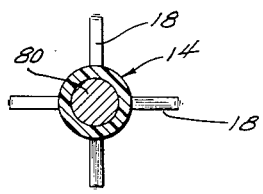
Fig. 6 is a section taken at 6—6 of Fig. 4 showing a section through the bearing normal to the axis thereof.

It may be desirable in some instances to modify the bearing portion of the rotor, as shown in Fig. 7. This modification has a cylindrical journal portion 82 integral with the rear face of the rotor 84. An aperture 86 is provided in order to prevent shrinkage from distorting the journal portion when the latter cools after the molding operation is completed.

A bearing cap 88 is made to conform internally with the journal portion 82, and is made of any suitable bearing material. The frame of the magneto 90 is provided with an aperture portion 92 which receives bearing 88, the latter being forced in place, or molded integrally with frame 90.

While a specific embodiment of this invention has been shown and described, the scope of this invention should be limited only by the following claims.

I claim:

1. In a magneto having a frame provided with a journal pin and a plurality of distributor brushes, in combination, a distributor rotor of polyamide resin comprising a front face and a rear face, an integrally molded hub on said rear face, the axis of said hub being normal to said front and rear faces, said hub having a journal aperture conforming to said pin, said pin being of sufficient length to contact the bottom of said aperture to thereby provide a thrust bearing, said rear face having spur-gear teeth disposed about the periphery of said rear face, the front face of said disc being provided with a recess coaxial with said hub and lying in a plane parallel to said front face and having a peripheral ledge, the face of said recess being provided with a plurality of undercut concentric grooves, a pair of metal inserts comprising a contact plate and a counterbalance member positioned diametrically opposed to each other in said recess and resting on said ledge, the balance of said recess being filled with an alkyd plastic so as to secure said inserts integrally therein with the upper surface of said alkyd plastic lying in a plane substantially common to said front face and said inserts, said alkyd plastic comprising a track for said distributor brushes and a spark barrier of alkyd resin integral with said track compressing a ring portion coaxial with said axis and extending axially from said front face.

2. In a magneto having a frame provided with a journal pin and a plurality of distributor brushes, in combination, a distributor rotor of nylon resin comprising a front face and a rear face, an integrally molded hub on said rear face, the axis of which is normal to said front face, said hub having a journal aperture conforming to said pin, said pin being of a length to contact the bottom of said aperture in order to provide a thrust bearing, said rear face having spur-gear teeth about the periphery thereof, the front face of said disc being provided with a recess substantially parallel to said front face, the face of said recess being provided with at least one undercut concentric groove, a metal insert comprising a contact plate positioned in said recess, the balance of said recess being filled with an alkyd plastic so as to secure said insert integrally therein with the upper surface of said alkyd plastic lying in a plane substantially common to said front face and said insert, said alkyd plastic including a spark barrier of alkyd resin integral therewith and in the form of an annulus concentric with said axis and integral with said front face.

3. In a magneto having a frame provided with a journal pin and a plurality of distributor brushes, in combination, a distributor rotor of polyamide resin comprising a front face and a rear face, a molded hub on said rear face the axis of which is normal to said front face, said hub having a journal aperture conforming to said pin, said rear face having spur-gear teeth about the periphery thereof, the front face of said disc being provided with a recess, said recess being provided with at least one undercut concentric groove, a contact plate insert positioned in said recess, the balance of said recess being filled with an alkyd plastic so as to secure said insert integrally therein, said alkyd plastic also including a unitary annular ring portion extending from said front face in an axial direction.

4. In a magneto having a frame and provided with a journal pin and a plurality of distributor brushes, in combination, a distributor rotor comprising a body portion of polyamide resin comprising a front face and a rear face, an integral hub on said rear face having a journal aperture conforming to said pin, spur-gear teeth about the periphery of said body, said front face being provided with a recess and a plurality of pads in said recess, a contact plate insert positioned in said recess and resting on said pads, the balance of said recess being filled with an alkyd plastic so as to secure said insert integral with said polyamide resin and anchored to said pads, said alkyd to provide a track for said brushes, and an annular ring molded integrally with said alkyd and being concentric with said journal aperture.

5. In a magneto having a frame provided with a journal pin, in combination, a distributor rotor of a resin of the class known as polyamide having the properties of not requiring lubrication, comprising a front face and a rear face, a hub molded on said rear face the axis of which is normal to said front face, said hub having a journal aperture conforming to said pin, the front face of said disc being provided with a recess having at least one undercut groove and a plurality of cylindrical pads, a contact plate insert positioned in said recess, the balance of said recess being filled with an alkyd plastic resin so as to secure said insert integrally therein, said alkyd plastic also including a unitary alkyd ring portion extending from the front face thereof in an axial direction.

6. In an electrical device having a frame provided with a journal pin, in combination, a distributor rotor of a resin of the class known as polyamide comprising a front face and a rear face, said rear face being provided with journal means conforming to said pin, said front face being provided with a recess having a ledge concentric with said journal, a contact plate insert positioned in said recess and abutting said ledge, the balance of said recess being filled with an alkyd plastic thereby securing said insert integrally therein, said alkyd plastic also including a unitary annular ring portion extending from said front face in an axial direction.

7. In a device having a frame provided with a journal pin, in combination, a distributor rotor of a resin of the class known as polyamide comprising a front face and a rear face, said rear face being provided with a journal aperture conforming to said pin, said front face being provided with a recess having a ledge concentric with said journal aperture, a contact plate insert positioned in said recess and abutting said ledge, the balance of said recess being filled with an alkyd plastic so as to secure said insert integrally therein, said front face, said alkyd plastic and said insert lying in a common plane.

8. In a magneto device provided with a frame and a journal sleeve, in combination, a distributor rotor comprising a body portion of polyamide resin comprising a front face and a rear face, an integral journal portion forming part of said rear face and conforming to said bearing sleeve, said front face being provided with a recess, a contact plate insert positioned in said recess, the balance of said recess being filled with an alkyd resin thereby securing said insert integrally with said polyamide resin and said alkyd resin.

9. In an electrical device having a frame and provided with a bearing member, in combination, a distributor rotor comprising a body portion of a resin selected from the polyamide group and comprising a front face and a rear face, an integral journal portion of said resin forming part of said rear face and conforming to said bearing member, said front face being provided with a recess, a contact plate insert positioned in said recess, the balance of said recess being filled with an alkyd having a contraction on cooling, less than that of said resin so as to secure said insert integrally with said first mentioned resin and said alkyd.

10. A composite distributor rotor comprising a body portion of a molded resin having a front face provided with a recess, a contact plate in said recess having a surface thereof substantially co-planar with said front face, the balance of said recess being filled with a resin having a contraction upon hardening less than that of the resin comprising said body portion.

11. A composite distributor rotor comprising a body portion of a molded resin having a front face provided with a recess, a contact member in said recess of an area less than said recess and having a surface thereof substantially co-planar with said front face, the space between said recess and said contact member being filled with a resin having a contraction upon hardening less than the contraction of the resin comprising said body portion.

References Cited in the file of this patent

UNITED STATES PATENTS

| | | |
|---|---|---|
| 1,962,728 | Walther | June 12, 1934 |
| 2,315,902 | Nowosielski | Apr. 6, 1943 |